United States Patent [19]
Morra et al.

[11] 3,898,647
[45] Aug. 5, 1975

[54] DATA TRANSMISSION BY DIVISION OF DIGITAL DATA INTO MICROWORDS WITH BINARY EQUIVALENTS

[76] Inventors: Pier Giuseppe Morra, C.so Plebisciti, 3, 20129 Milan; Loris Crudeli, Frazione Saliceto, 12060 Pocapaglia (Cuneo), both of Italy

[22] Filed: July 23, 1973

[21] Appl. No.: 381,617

[30] Foreign Application Priority Data

July 21, 1972 Italy .................................. 27264/72

[52] U.S. Cl. ............. 340/347 DD; 178/68; 340/353
[51] Int. Cl. ............................................ H03k 13/00
[58] Field of Search ............ 340/347 DD, 353, 206; 178/68; 325/141

[56] References Cited

UNITED STATES PATENTS

| | | | |
|---|---|---|---|
| 2,916,209 | 12/1959 | Adamson et al. | 340/347 DA |
| 2,917,236 | 12/1959 | Reisch | 235/176 |
| 3,018,960 | 1/1962 | Dirks | 235/176 |
| 3,597,600 | 8/1971 | Herendeen et al. | 235/156 |

*Primary Examiner*—Thomas J. Sloyan
*Attorney, Agent, or Firm*—Young & Thompson

[57] ABSTRACT

Method and means for processing data in the transmission and/or transfer of the data itself, making use of a modulation system acting on the number of elements (microwords) into which the original digital data is divided.

3 Claims, 3 Drawing Figures

TRANSMITTER

RECEIVER

DATA TRANSMISSION BY DIVISION OF DIGITAL DATA INTO MICROWORDS WITH BINARY EQUIVALENTS

BACKGROUND OF THE INVENTION

It is known that in the transmission and/or transfer of items of information of any kind in digital form, modulated signals representing the data to be transmitted are inserted into a transmission channel or admitted onto transfer means. The modulation is carried out in such a way as to suffer the least possible from attenuation, distortion, addition of noise and so forth, due to the channel or to the transfer means. The signals are then demodulated at the output of the transmission channel or of the transfer means in order to reconstitute the original data.

It is understood that the transmission channel can be a radio or telegraphic channel, an optical connection, a coaxial cable or the like.

It is also known that errors in the transmission or transfer of data arise at the time of demodulation, when the demodulator, due to disturbances undergone by the signals along the channel or in the transfer means, is no longer in a position to reconstitute the original data.

At the present state of the art, various modulation systems are commonly used in the transmission of digital information items, but all of them act on the shape of the signals to be inserted into the transmission channel (or admitted onto the transfer means).

The drawback of these systems lies in the fact that, distortions and disturbances can bring about variations in the shape of the signals themselves which, especially in the phase of the demodulated signals, can be such as to cause a demodulator to confuse or take one signal for another and therefore to reconstitute data different from the original data.

The present invention relates to a method for processing data, whereby the above drawback is reduced to a minimum and which also allows important advantages because of the greater density of the information items transmitted or transferred, for equal channel or transfer means, and because of the simplicity of the circuits required to carry out said method.

The present invention also relates to means to carry out said method.

SUMMARY OF THE INVENTION

The method according to the invention is characterized in that, in transmission, the original data to be transmitted, expressed in digital form by a series as long as required of bits, is divided into elements of $n$ bits (called "microwords"); each microword is interpreted as a binary number; the said binary number is translated into the corresponding decimal number; a train of symmetrical pulse pairs containing a number of pulse pairs equal to the said decimal number and corresponding to the said microword is inserted into the transmission channel or admitted onto the transfer means; and a pause, having a duration equal to the duration of one of said pulse pairs, is interposed between one pulse train and the next, for the purpose of separating them; and in that, in reception, for each pulse train, the pulse pairs of the said train are counted with a binary counter, the output of which at the end of the said train constitutes the microword corresponding to the said train, which microword is identical to the microword transmitted.

In this method, the microword will preferably be composed of three bits ($n = 3$).

This method can be carried out with a wide variety of means of any type known "per se", but lends itself particularly well to being put into practice by using common electronic components. Without introducing any limitation to such a variety of means, the present invention provides for this method to be advantageously carried out by means of a transmitter comprising: a register, the input of which is the digital data of required length to be transmitted, and the output of which is the said $n$-bits microword; and $n$-stages counter of the transmitted pulse pairs coming from a generator; a comparator, which compares in binary terms the microword with the content of the counter and stops the generation of the pulse pairs when there is equality, creating a pause in the transmission of the pulse pairs themselves, which separates each pulse train corresponding to a microword; and a transducer, for inserting the pulse pairs into a transmission channel or admitting them onto transfer means; by means of a transmission channel or transfer means; and by means of a receiver comprising: a transducer, which draws the pulse pairs from the channel or from the transfer means; an $n$-stages counter, which counts the pulse pairs received; a circuit for detecting the pause between successive trains of pulse pairs, which controls the output of the microwords from the counter; and a register, which receives the microwords and in which the original digital data is reconstituted.

The invention will now be described hereinafter in further detail, by mere way of example and not restrictively, with reference to the accompanying drawings, in which:

DESCRIPTION OF THE PREFERRED EMBODIMENT

Figure 1:
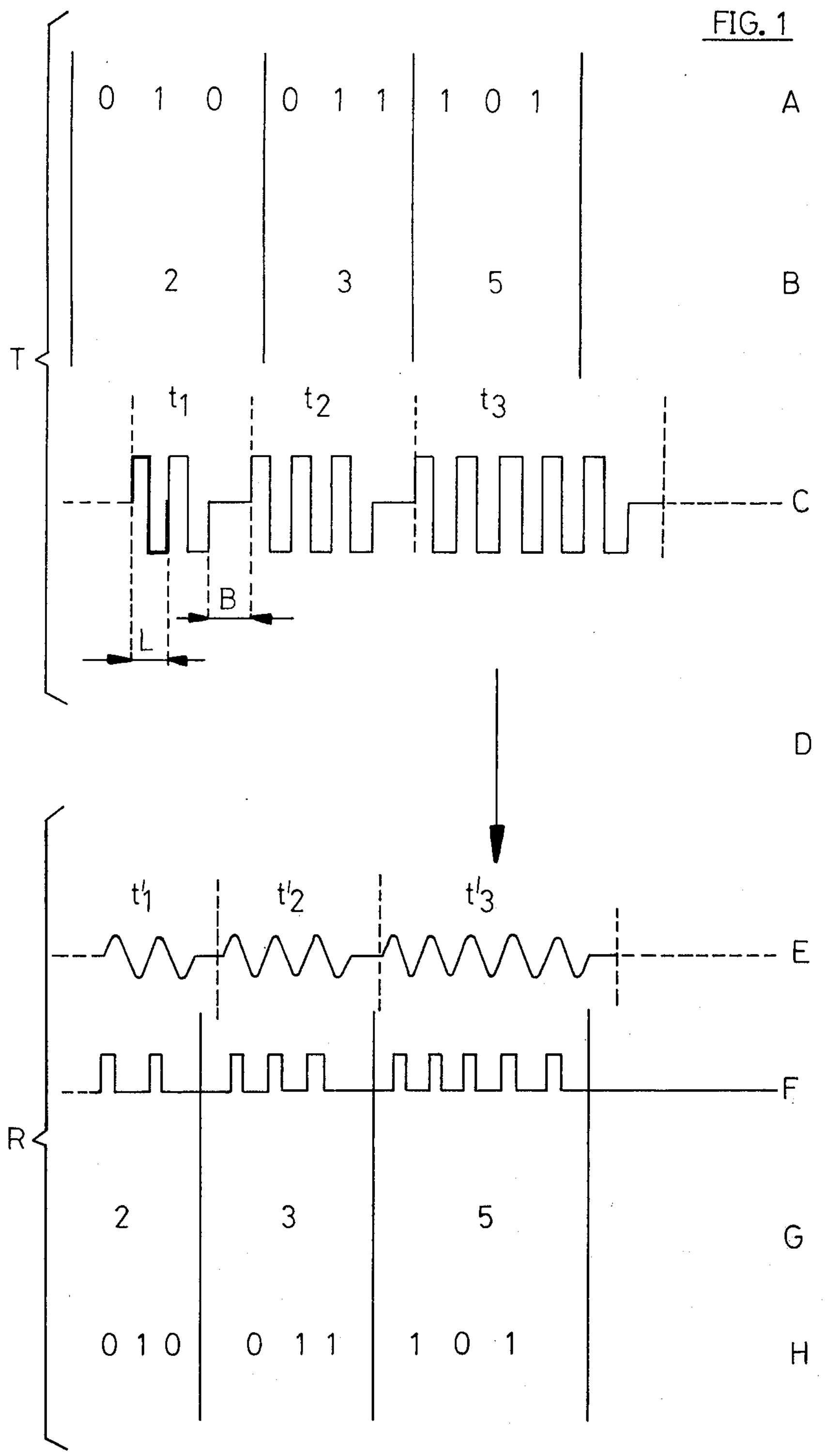
FIG. 1 is a diagram illustrating the modulation system carried out with the method of the present invention.

First with reference to FIG. 1, according to the method of the present invention, the data to be transmitted (in the case illustrated consisting of a series of nine bits), is divided (A) in the transmitter T into microwords (three microwords of three bits each: $n = 3$), each of which is interpreted as a binary number which is then translated (B) into the corresponding decimal number. In accordance with the invention, three pulse trains $t_1$, $t_2$, $t_3$, are inserted (C) into the transmission channel or admitted onto the transfer means, each pulse train containing a number of symmetrical pulse pairs equal to the decimal number (indicated in B) of the corresponding microword. The pulse trains $t_1$, $t_2$, $t_3$ are separated one from the other by a pause B of duration equal to the pause L of one pulse pair (C). In other words, what is meant by a "symmetrical pulse pair" is what is shown by way of mere example in heavy line at L in FIG. 1.

From the transmission channel D three trains of attenuated and distorted pulse pairs $t'_1$, $t'_2$, $t'_3$, arrive at the receiver R, shown at E, which pulse trains are shown re-shaped at F and then counted at G by a binary counter, the output of which, indicated at H, gives, in binary form, the three starting microwords thus reconstituting the transmsitted data A.

Figure 2:
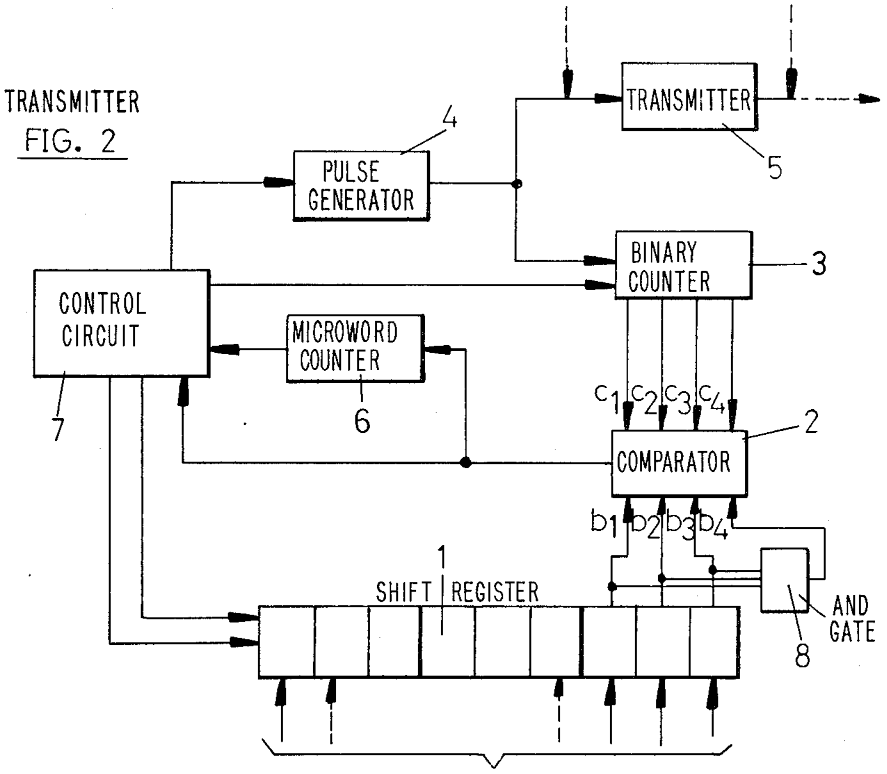
FIGS. 2 and 3 are block diagrams of a transmitter and, respectively, of a receiver having electronic components which allow the said method to be carried out, it being understood that between them is interposed a transmission channel (not shown) or transfer means.
Figure 3:
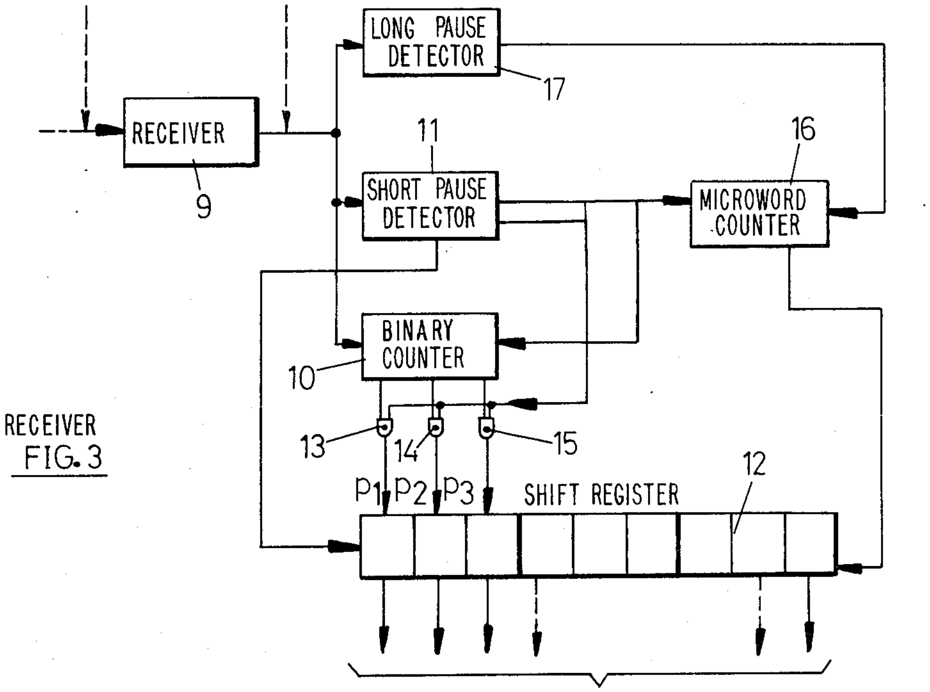

To carry out the illustrated method, one may conveniently use an apparatus in which the transmitter and the receiver, which may of course be bi-directional, are constituted as shown in FIGS. 2 and 3 and are connected by a transmission channel or by transfer means (in known manner, not shown). As can be seen from FIG. 2, in the transmitter the data to be transmitted is inserted in parallel into a shift register 1, which operates the input and output of the data in parallel. This register has to be of sufficient length to contain the data to be transmitted, but always ($n = 3$) for multiples of 3 bits (for multiples of $n$ bits if $n$ were different from 3). It will therefore be $3m$ bits long where $m$ is the number of microwords into which can be divided the data to be transmitted.

The content of the last three bits of the register 1 is then drawn and converted into a decimal number of pulse pairs equivalent to the binary value of the corresponding microword, that is to say, into a train of pulse pairs which may vary from 1 to 8 and which is immediately transmitted through the transmission channel. In greater detail, this is obtained in the following manner: the microword to be converted $b_1$, $b_2$, $b_3$ is fed to a comparator 2 which compares it with the output $c_1$, $c_2$, $c_3$ of a binary counter 3 initially set to zero. A pulse pair generator 4 sends pulse pairs to the actual transmitter (or transducer) 5. The counter 3 counts the pulse pairs transmitted: when the content of the counter 3 is equal to the microword to be transmitted ($c_1 = b_1$; $c_2 = b_2$; $c_3 = b_3$), the comparator 2 sends a pulse pair to a counter 6 of the microwords and, by means of a control circuit 7, stops the generation of further pulse pairs by the generator 4. In this way, automatically the number of pulse pairs transmitted will be equal to the decimal equivalent of the microword $b_1$, $b_2$, $b_3$. In the event of wanting to transmit the microword 0, 0, 0, in order to prevent the transmission of 0 pulse pairs (which would have the sense of a pause), one sends to the comparator 2 a fourth bit $b_4$; generated by an AND gate 8, such that:

$$b_4 = \bar{b}_1 \cdot \bar{b}_2 \cdot \bar{b}_3$$

in Boolean notation, together with the output $c_4$ of the counter 3. In this way, for the particular combination 0, 0, 0, eight pulse pairs will be transmitted.

Between one train of pulse pairs and the next, is inserted a pause of the length of one pulse pair, required, on the one hand, for the receiver to distinguish one train of pulse pairs from the next, and used, on the other hand, in transmission, so as to cause the register 1 to shift by three steps and to thus be able to draw the next microword. The control circuit 7 sees to this.

The whole process described hereabove is repeated for $m$ times, to complete the emptying of the register 1, which is signalled by the counter 6 counting the microwords transmitted: when the counter 6 reaches the value $m$, a pulse pair is sent to the control circuit 7, which generates a pause three pulse pairs long, to load the new data to be transmitted into the register 1 and to start again the cycle.

In reception, as shown in FIG. 3, each pulse train coming from the transmission channel or from the transfer means is detected by an actual receiver (or transducer) 9, and the pulse pairs of the said train are counted by a three-stage binary counter 10, suitably set to zero before the arrival of each train, as seen hereinafter. The counter 10 hence supplies as output, at the end of each train of pulse pairs, the initial microword. In the particular case where it receives a train of 8 pulse pairs, the counter 10 returns into the configuration 0, 0, 0, that is to say, the same which had been transmitted.

During the pause, one pulse pair long, which separates the single trains detected by a circuit 11, a reception shift register 12, similar to the register 1 of the transmitter, is caused to shift by three steps, to make room for data in 10, and the content of the counter 10 ($p_1, p_2, p_3$) is then transferred by means of control gates 13, 14, 15, into the first three cells of the shift register 12 after the three step shift that makes room for further incoming data.

At this point, the counter 10 is set to zero and is thus ready to count the pulse train corresponding to the next microword. The cycle then continues up to reconstitution of the data transmitted. The completion of the reception is controlled by a counter 16 of the microwords, similar to the microword counter 6 of the transmitter. When the counter 16 reaches the value $m$, that is to say, all the microwords transmitted have been received, a pulse pair is sent to the shift register 12, which authorizes the output transfer in parallel of the data contained in the shift register 12 itself.

The completion of data transmission, indicated by the pause of the length of three pulse pairs, which is detected by a special circuit 17, causes the microword counter 16 to be set to zero and hence prepares the receiver for the reception of further data.

The method according to the invention has various advantages compared to known art, thanks to its capacity of sensing, far less than the known systems, the negative effects of the transmission channel and of the transfer means (attenuation, distortion, disturbances). In this way it is therefore possible, with the method according to the invention, to obtain with equal transmission channel or transfer means: (*a*) greater density of the information items transmitted; (*b*) higher transmission speed; (*c*) greater transmission distance. Furthermore, thanks to the particular nature of the method, this latter allows a substantial simplification in carrying out error detection circuits.

Although, in the foregoing description, reference has been made to the case of transmitting data of finite length, the method and the means therefor can be adopted also in the case of a continuous flow of the information items.

It is also understood that, although the particular embodiment described and illustrated of the invention has been referred to the case in which the data is divided into microwords of 3 bits each, and in which the type of pulse pairs adopted is the bipolar type shown at C in FIG. 1, it is possible, without difficulty, to provide for the division of the data into microwords of $n \neq 3$ bits and for the use of a different type of pulse pairs. Nevertheless, the division adopted has the advantage of providing maximum average efficiency of transmission, in that it reduces to a minimum the time required to transform the microword into a train of pulse pairs. In turn, the use of the particular type of pulse pairs of FIG. 1 (suitable especially in the case where the transmission channel is an electric cable or an electric line) is advantageous, in that the pulse pair is composed of two half-pulses of opposite polarity, so that the medium voltage and/or current of the pulse pair are nil and hence reduce to a minimum the disturbance which the pulse pair itself produces on the channel (which is thus always in equilibrium and in conditions of minimum distortion).

What is claimed is:

1. A method for the automatic electronic transmission of data by means of an electronic transmitter and an electronic receiver, comprising the steps of inserting into the transmitter in digital form the data to be transmitted in the form of a series of microwords each consisting of three bits whose different arrangements correspond each to a different one of eight possible decimal integers, electronically counting the number of microwords in said series, electronically converting each said microword into a train of symmetrical pulse pairs followed by a pause, the number of pulse pairs in each said train being equal to the integer that corresponds to the associated microword binary meaning, transmitting said trains of pulse pairs with interspersed pauses to said receiver, in said receiver counting in an electronic counter each said train of pulse pairs, resetting said counter during each said pause, electronically reconstructing in said receiver each microword that corresponds to the number of pulse pairs counted during each pulse train, electronically counting the number of microwords thus reconstructed, and, when said number of microwords thus reconstructed equals said number of microwords in said series, electronically producing an output of said reconstructed microwords, thereby reconstructing the transmitted data in the form of the same said series of microwords.

2. Apparatus for the automatic electronic transmission of data, comprising an electronic transmitter and an electronic receiver, the transmitter comprising means for inserting into the transmitter in digital form the data to be transmitted in the form of a series of microwords each consisting of three bits whose different arrangements correspond each to a different one of eight possible decimal integers, means for electronically counting the number of microwords in said series, means for electronically converting each said microword into a train of symmetrical pulse pairs followed by a pause, the number of pulse pairs in each said train being equal to the integer that corresponds to the associated microword binary meaning, means for transmitting said trains of pulse pairs with interspersed pauses to said receiver, said receiver comprising an electronic counter for counting the pulse pairs of each said train, means for resetting said counter during each said pause, means for electronically reconstructing in said receiver each microword that corresponds to the number of pulse pairs counted during each pulse train, means for electronically counting the number of microwords thus reconstructed, and, when said number of microwords thus reconstructed equals said number of microwords in said series, means for electronically producing an output of said reconstructed microwords, thereby reconstructing the transmitted data in the form of the same said series of microwords.

3. Apparatus as claimed in claim 2, said transmitter comprising a register the input of which is the digital data of required length to be transmitted and the output of which in said microwords of three bits each, a three-stage counter of the transmitted pulse pairs coming from a generator, a comparator which compares in binary terms the microword with the content of the counter and stops the generation of the pulse pairs when there is equality thereby creating a said pause between pulse trains, and a transducer for inserting said pulse pairs into said transmitting means, said receiver comprising a transducer which draws said pulse pairs from said transmitting means, a three-stage counter which counts the pulse pairs received, a circuit for detecting said pauses which controls the output of the microwords from the last-named counter, and a register which receives the microwords and in which the original digital data is reconstructed.

* * * * *

UNITED STATES PATENT AND TRADEMARK OFFICE

CERTIFICATE OF CORRECTION

PATENT NO. : 3,898,647

DATED : August 5, 1975

INVENTOR(S) : Pier Giuseppe MORRA and Loris CRUDELI

It is certified that error appears in the above-identified patent and that said Letters Patent are hereby corrected as shown below:

Claim 3, line 4, change "which in said" to --which is said--.

Signed and Sealed this

*twenty-fourth* Day of *February 1976*

[SEAL]

*Attest:*

RUTH C. MASON
*Attesting Officer*

C. MARSHALL DANN
*Commissioner of Patents and Trademarks*